3,333,432
ADJUSTABLE DEPTH SUBMARINE
CABLE BURIER
Albert L. Hale, Berkeley Heights, Otto C. Niederer, Westfield, and Francis J. Spollen, Elizabeth, N.J., assignors to Bell Telephone Laboratories, Incorporated, New York, N.Y., a corporation of New York
Filed Dec. 29, 1964, Ser. No. 421,865
6 Claims. (Cl. 61—72.4)

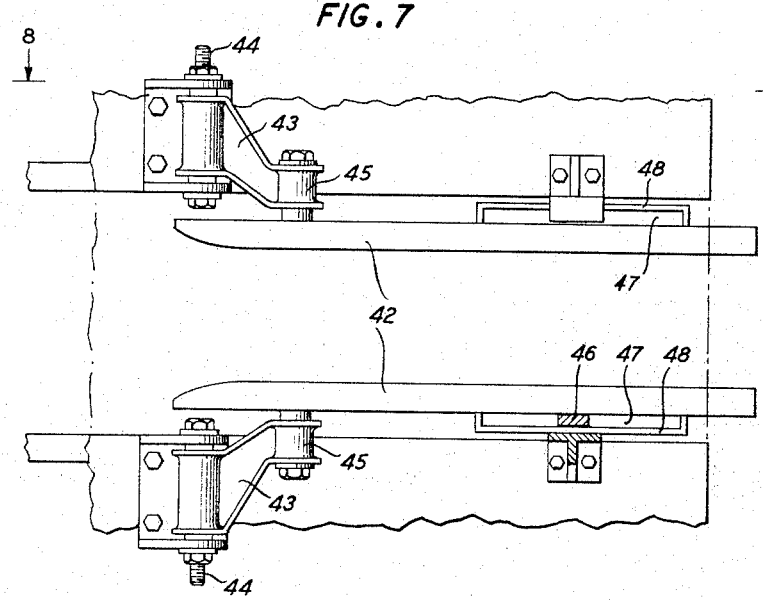
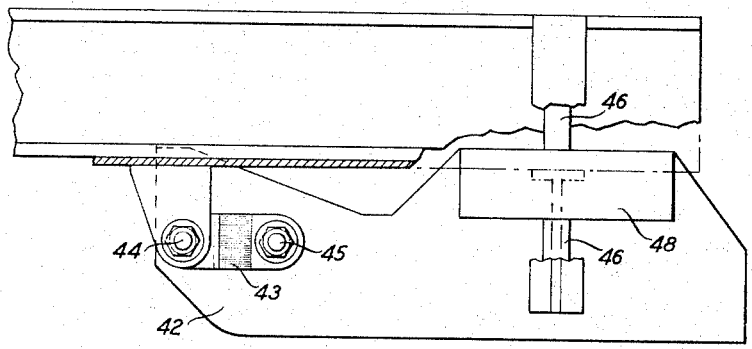
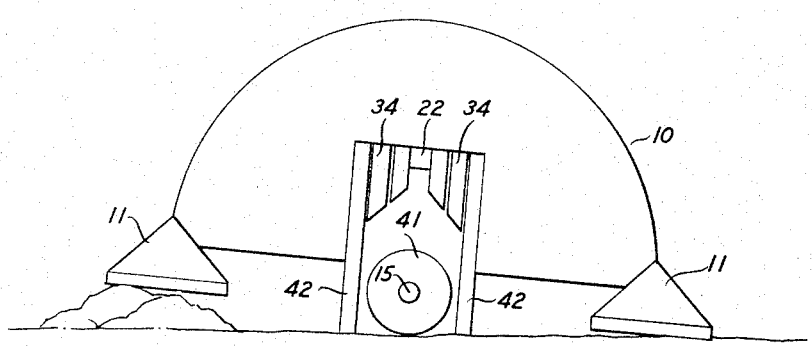

ABSTRACT OF THE DISCLOSURE

A submarine communications cable burying plow consists of a main frame mounted on sled-type runners, a large forward bell mouth that receives the cable, and a cable guide rotatably mounted to the forward end of the frame. The guide is lowerable into the ocean bed at varying depths and includes jetting nozzles that direct streams of water in front of the guide to dig a trench. The cable passes through the guide and into the trench.

---

This invention relates to a device for placing cable under ground, and more particularly, to a device for placing cable under ground under a body of water.

As the need for communications and other similar services grows, more and more electrical cable is being placed under water. When it is so placed, the cable becomes relatively inaccessible in that if mechanical or electrical failures occur, the cable must be first located and then retrieved before any repairs can be made. It therefore becomes very desirable to be able to protect the cable when it is placed under an ocean, lake, or river.

In the past, cable has been protected in a number of ways; two of the most common being to armor or bury the cable. The method of burying the cable in the ground under water yields two advantages. The first advantage is that the cable is concealed in the ground and therefore is not exposed to such abuse as abrasive wear caused by underwater currents nor more importantly, to damage caused by underwater objects being towed or dragged across the cable such as fishing trawler equipment or anchors.

The second advantage is that inasmuch as it is buried in the ground, the cable need not be armored and therefore the expense of armoring the cable is saved.

A number of devices are known in the prior art for plowing cable into the ground under water. Most of these devices are designed either for cable burying in shallow water or for short lengths of continuous cable. When cable is to be laid across a large body of deep water, for example an ocean, it is necessary that the continuity of the cable be interrupted at approximately twenty mile intervals for the insertion of electrical amplifiers commonly known as repeaters. These repeaters are much larger in diameter than the cable, are elongated, and of rigid construction. Unless an underwater plow has been designed to handle repeaters, it is obvious that it cannot be used for burying transoceanic cables.

Experience has also shown that cable should be buried deeper near shorelines, in soft ground, or in places where there is a considerable amount of activity. If the ground is hard and the danger of cable damage is slight, it is desirable, from a practical and economic viewpoint, to bury the cable at a lesser depth. In order to do this, it is necessary that the cable burier be capable of burying the cable at different controlled depths depending upon the desires of the operators.

The major portion of the prior art includes devices that bury cable at a fixed depth. Although devices having variable depth shares are known, the depth of the share is usually determined by the geometry of the burier as it reacts to such things as the rate of speed the cable is being buried, the pulling force created by the resistance of the ground to the passing of the share through it, the density of the ground in which the cable is being buried, and other like properties. In other words, the burying depth is controlled by the environment in which the cable is being buried or the conditions under which it is being buried but not according to the predetermined desires of the operator.

In view of the above, an underwater cable burier that can be controlled remotely from the surface, that will handle cable repeaters, and that will bury cable at variable depths in the ground depending upon the predetermined plans of the operators, is very desirable. The embodiment of the invention to be described hereafter includes these desirable features.

The invention is embodied within a cable burier that is comprised of a main frame mounted upon sled-type runners. The cable to be buried extends from a ship and is introduced to the cable burier through a large bell mouth. The cable then passes between a pair of cable centerers and into a cable guide. The cable guide is rotatably mounted to the frame so that it may be lowered into the ground at variable depths by means of a hydraulic cylinder and includes jetting nozzles that direct streams of water in front of the guide to dig a trench. As the cable passes through the guide, it is placed in the trench.

As previously mentioned, the cable burier must be adapted to handle repeaters. Therefore, the bell mouth is of sufficient size to allow a cable repeater to pass therethrough and the cable centerers are spring loaded so that they may be moved apart to allow a cable repeater to pass between them. Inasmuch as repeaters are not buried but are left exposed on the ocean floor, the cable guide must be retracted a sufficient amount to allow the burier to pass over a repeater without damaging it or imbedding it in the ground.

After the burier passes over a repeater, the cable must be realigned with the guide so that the guide may once again entrench it in the ocean floor. The spring loaded cable centerers initiate the realignment process but in order to ensure a complete alignment of the cable, the embodiment of the invention further includes a cable rethreading device. The device, called a rethreader, includes a U-shaped guide that may be hydraulically placed over the cable after the passage of a repeater. Because of its shape and location on the burier, it automatically realigns the cable with the cable guide.

Various other devices may be mounted upon the frame to fulfill specific needs. For example, a television camera may be mounted upon the frame so that the actual cable burying operation may be monitored remotely from the surface. It is obvious that if lighting is required for the television cameras that large high-intensity lights may also be mounted upon the frame. It is also contemplated that sonar and general monitoring equipment such as attitude devices be placed upon the frame so that the attitude of the burier and its component parts may be determined at a remote station irrespective of whether or not the television camera is working.

The invention will be better understood and its advantages and features will be more readily apparent upon the study of the following detailed description of an illustrative embodiment when it is read in conjunction with the drawing, in which:

FIG. 7 is a plan view showing the free-floating restraining plates;

FIG. 8 is a side view showing one of the restraining plates; and

FIG. 9 is a front view showing the restraining plates adapting for changes in ground contour.

Figure 1:
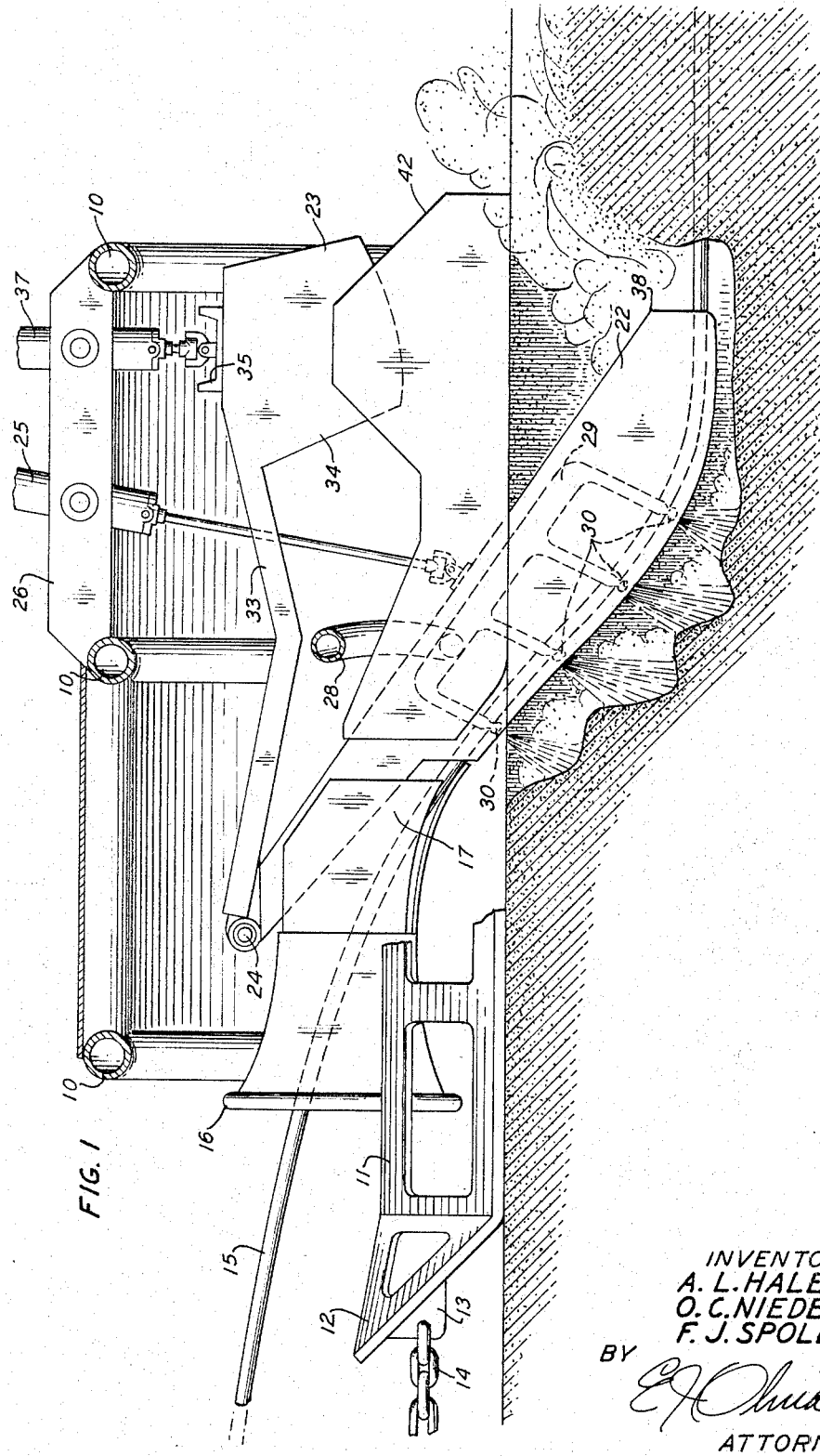
FIG. 1 is a section view of an illustrative embodiment of the invention showing the various components of the device in their respective relationship to each other.
Figure 2:
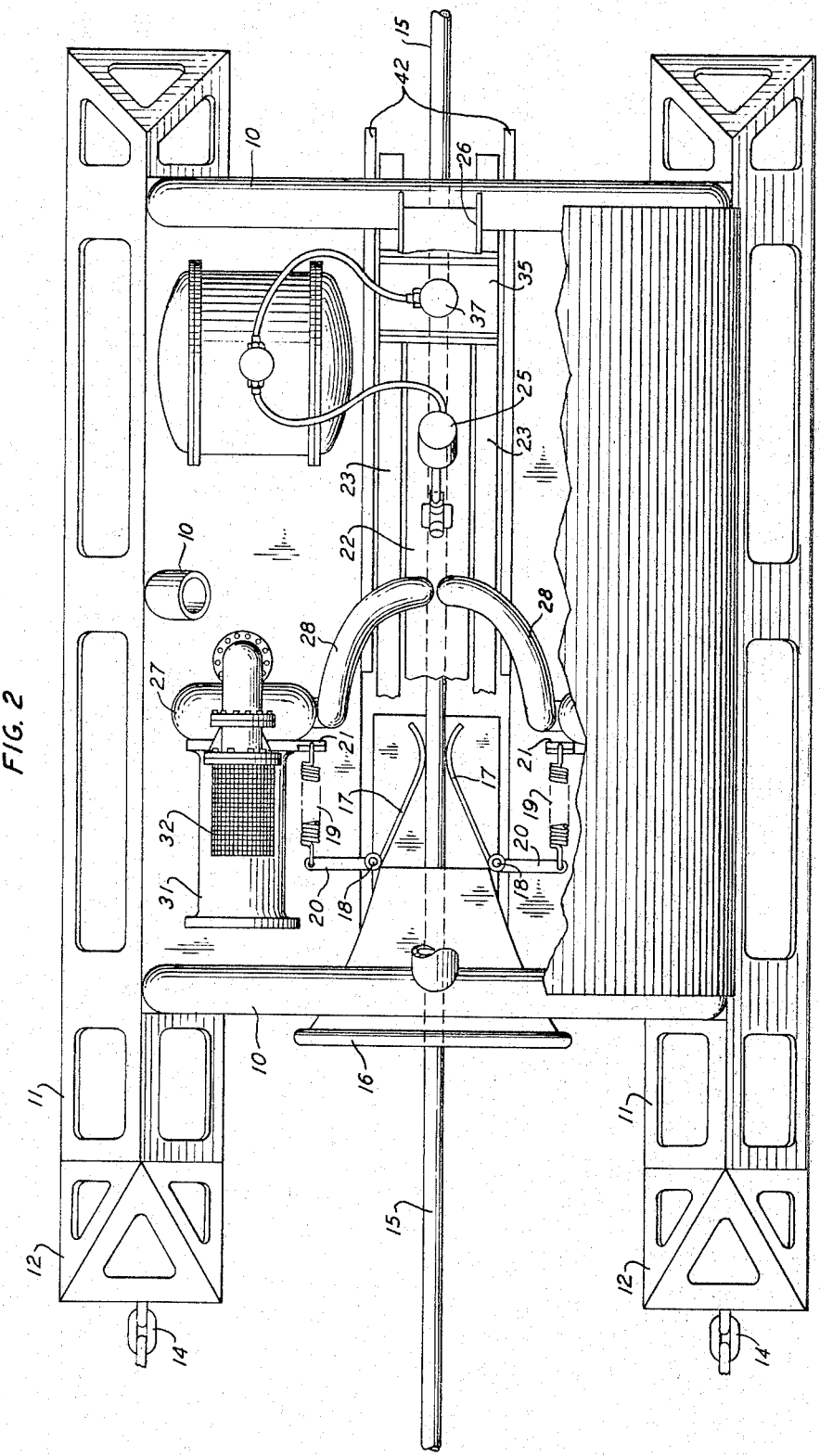
FIG. 2 is a plan view of the embodiment shown in FIG. 1.

With particular reference to FIGS. 1 and 2, the illustrative embodiment of the invention comprises a frame made of tubular members 10 mounted upon sled-type runners 11. Although the device has been disclosed as being mounted upon sled-type runners 11, it is clear that wheels, tracks, or other types of support configurations may be used. The front portions 12 of the runners 11 are turned up to facilitate the towing of the burier over the ground. A bracket 13 is welded to each portion 12 and includes means to which a towing cable or chain 14 may be attached for towing the device.

The device further includes a large funnel-shaped bell mouth 16, the mouth of which opens toward the front of the device or in the direction of the towing chains 14. The shape of the bell mouth may be circular or rectangular, the latter shape being preferred for reasons to be explained subsequently. A pair of centering gates 17 are attached to the frame by means of hinges 18 and springs 19 immediately behind the smaller opening of the bell mouth 16. The springs 19 are attached to the gates 17 by means of lever arms 20 and are attached to the frame by means of brackets 21. The springs 19 urge the gates 17 toward the axial center line of the device.

Two vertically mounted plates 42 are attached to the device; one on each side of the device's center line. The plates 42 form a walled passageway and restrict the cable 15 to a general location with respect to the device.

The plates 42 are attached at their leading end to the frame by means of links 43. One end of each link 43 is attached to the frame by a pivot 44 and the other end is attached to the plates 42 by a second pivot 45. The trailing end of the plates 42 is attached to the frame by means of a vertical guide pin 46 and an elongated longitudinal slot 47. The pin 46 is part of the frame and the slot 47 is included in a support member 48 that is attached to the trailing end of each plate 42 as shown in FIGS. 7 and 8.

The net effect of mounting the plates 42 to the device in the manner described above is to free-float the plates 42 in a vertical direction. Thus, the plates 42 may stay in intimate contact with the ground at all times regardless of minor contour variations. This ensures that the cable 15 will always be restrained in the area between the two plates 42.

A cable guide 22 and a rethreader 23 are rotatably attached to the frame by means of a common axle 24. The guide 22 and the rethreader 23 are hydraulically operated by means of hydraulic cylinders 25 and 37 respectively. The cylinders 25 and 37 are attached to the frame by means of a support member 26 that extends between two of the tubular frame members 10.

The cable guide 22 is essentially a cantilever arm rotatably attached to the frame by means of the axle 24. The end 38 of the guide 22 is lowered between the plates 42 into the ground and raised therefrom by means of the cylinder 25. A trough 39 runs approximately the entire length of the underside of guide 22 and is appropriately shaped to place a cable 15 in a trench without damaging the cable 15 by excessive bending. The sides of the trough 39 terminate in tapered edges 40.

The device is adapted to dig a trench by means of directing streams of water ahead of and down from the cable guide 22. A water pump 27 is mounted upon the frame and connected by means of a hose 28 to the cable guide 22. The guide 22 includes ducting 29 and jetting nozzles 30. The nozzles 30 are located in the edges 40 of the guide 22. The pump 27 includes a water intake 32 and is powered by an electrical motor 31. Water enters the intake 32, is moved by the pump 27 through the hose 28 and into the ducting 29 of the guide 22. The nozzles 30, because they are located in the front edges 40 of the guide 22, direct streams of water against the ground in front of the guide 22. The streams of water move the soil aside, thereby forming a trench in front of the guide 22.

Although the above description has mentioned only one pump 27, motor 31 and hose 28 supplying the guide 22 with water, it is obvious that the same equipment may be duplicated on the other side of the device to provide added water capacity for digging.

The rethreader 23 is comprised of two cantilever arms 33 one of which is located on each side of the guide 22. The arms 33 are joined at one end by a beam 35 and rotatably attached to the frame at the other end by means of the axle 24. The rethreader 23 further includes two plates 34 that are attached to the arms 33 in such a manner as to form a U-shaped section that straddles the guide 22 near the end 38. As shown in FIGS. 3 through 6, the plates 34 are of sufficient length so that the guide 22 may be completely retracted within the U-shaped section formed by the plates 34 and the beam 35. Each plate 34 further includes a wedge-shaped edge 36, the function of which will be subsequently described.

The cable burier embodying the invention is adapted to be towed and remotely controlled by a ship on the surface of the water. The burier is towed by means of the towing cables 14 which are attached to the brackets 13 on the front of the runners 11. The cable 15 that is being laid by the ship passes overboard and is introduced to the device through the bell mouth 16. The cable then passes between the two spring loaded gates 17 that urge the cable 15 toward the center line of the device. As the cable 15 emerges from the gates 17, it passes into the trough 39 of the guide 22.

The hydraulic cylinder 25 is then actuated which pushes the guide 22 down toward and into the soil. As the burier is towed along behind the ship, the jetting nozzles 30, as previously described, dig a trench in front of the guide 22. The guide 22 then inserts the cable 15 into the trench as the device is towed along.

Figure 3:
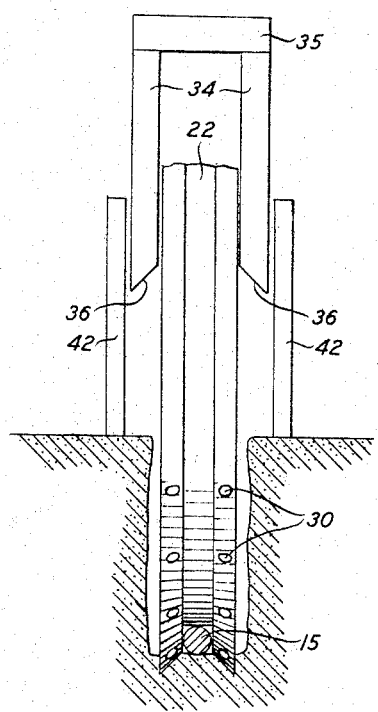
FIGS. 3 through 6 are front end views of the burying and rethreading equipment included in the device.
Figure 4:
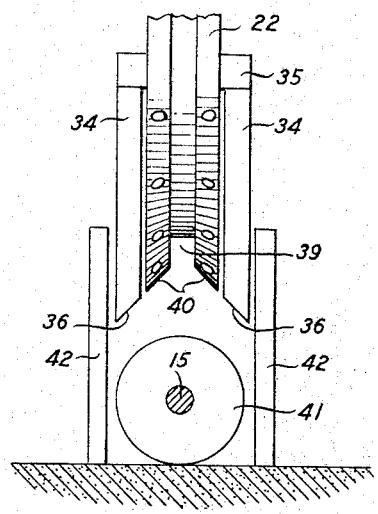

FIG. 3 shows the rethreader in its retracted position and the guide 22 in its lowered position as they would appear during the process of burying cable. Just before a repeater 41 passes through the device, the guide 22 is retracted by means of the cylinder 25 in between the plates 34 of the rethreader 23 as shown in FIG. 4. This allows the repeater 41 to be laid on top of the ground without burying it. It should be noted that, as the repeater 41 passes through the bell mouth 16, it will force the gates 17 open. After the repeater 41 passes the gates 17, the springs 19 will urge the gates 17 toward the center line of the device and will thereby urge that section of the cable 15 that immediately follows the repeater 41 toward the center of the device. The device has thus been adapted to handle repeaters 41 by including a bell mouth 16 of sufficient size to pass a repeater 41, by spring loading the gates 17 so that they may be moved aside to pass a repeater 41 and by including a retractable guide 22 and rethreader 23.

Figure 5:
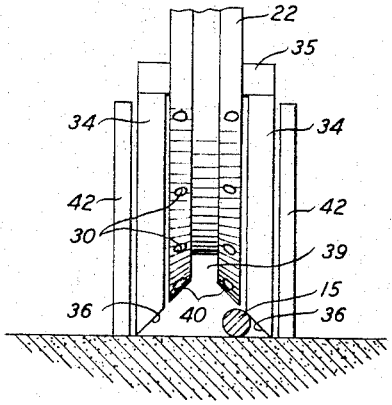

After a repeater 41 has passed through the device, and the rethreader 23 and guide 22 are retracted as shown in FIG. 4, the cable 15 may have moved off center from the center line of the device but not outside of the plates 42 as shown in FIG. 5. Before the guide 22 may be lowered into the ground and continue its function of burying the cable 15, the cable 15 must be realigned with the trough 39 of the guide 22. This is the function of the rethreader 23. As shown in FIG. 5, the plates 34 of the rethreader 23 extend past the foremost edges 40 of the guide 22 when the guide 22 is retracted into the rethreader 23. As the rethreader 23 and guide 22 are lowered, the edges 36 of the plates 34 will come in contact with the off-centered cable 15 and urge it toward the center of the device or in the direction of the trough 39 of the guide 22. The rethreader 23 will find the cable 15 anywhere between the plates 42 and move it toward the guide 22. This is shown in FIG. 5.

In order to ensure that the edges 36 of the rethreader 23 will come in contact with the cable 15 before the edges 40 of the guide 22, the cylinders 25 and 37 may be designed such that the cylinder 37 will work faster than the cylinder 25. The cylinder 37 will tend therefore, to force both the guide 22 and the rethreader 23 down, thus ensuring that the guide 22 will remain fully retracted in the rethreader 23.

Figure 6:
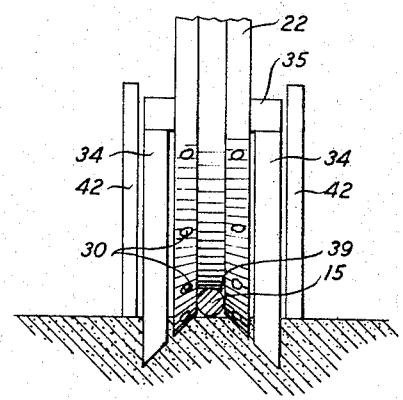

FIG. 6 shows the rethreader 23 in its lowermost position. It follows the guide 22 down to a position approximately shown in FIG. 6 at which time the cable 15 has been moved toward the edges 40 of the guide 22 by the edges 36 of the plates 34. The recentering of the cable 15 is then finished by the edges 40.

When the cable 15 is centered as shown in FIG. 6, the guide 22 is then further lowered into the ground by means of the hydraulic cylinder 25 and the rethreader 23 is retracted into the device by the cylinder 37 until they are once again in the positions shown in FIG. 3.

The device has been described in terms of burying a cable 15 as it is being laid by a ship. It is also contemplated to use the device for burying cable 15 that is already in existence or for burying cable partially laid. It is obvious, that if the bell mouth 16 is of one continuous piece of material, that an end of the cable 15 must be threaded through the bell mouth 16. This requires that the device be threaded on the cable 15 when the laying operation is initiated or that the cable 15 be cut, threaded through the bell mouth 16 and spliced before burying operations may be commenced.

As previously mentioned, the preferred shape of the bell mouth 16 is rectangular. Such a shape readily adapts the bell mouth 16 to be made of two pieces that may be hinged together. With such an arrangement, the device may be lowered into the water over an existing length of cable 15. Divers may then open the bell mouth 16, place the cable 15 into the bell mouth 16 and then close it about the cable 15 thus alleviating the necessity for cutting the cable 15 or threading a cable end.

It is obvious to those skilled in the art that numerous changes and modifications may be made to the embodiment as it has been disclosed above without departing from the spirit and scope of the invention.

What is claimed is:

1. A device for burying cable in the soil under water comprising:
   a frame mounted on sled-type runners;
   cable guide means pivotally attached within said frame and including means for plowing a trench and means for guiding the cable into the trench;
   actuating means controlled from a remote station and connected to said guide means for rotating said guide means toward and into said soil to a degree designated by said station;
   aligning means mounted on said frame and comprising a forward tapered bell mouth for receiving the cable and for maintaining alignment of said cable with respect to said frame and to said guide means, said bell mouth being large enough to pass a rigid and relatively wide repeater; and
   rethreading means retractably mounted with respect to said guide means and comprising an open section for engaging said guide and for urging said cable toward said guide means.

2. The device of claim 1 wherein said aligning means further comprises a pair of spring-loaded plates located between said bell mouth and said guide means for directing said cable centrally into said guide means, said plates spreading to effect passage of said repeater.

3. The device of claim 2 wherein said rethreading means further comprises inwardly-beveled bottom edges movable to a position adjacent to and outwardly of said guide means for urging said cable toward said guide means.

4. The device of claim 3 further comprising a pair of vertically extending, free-floating plates attached to said frame, one of said plates located on each side of the center line of said device, said plates adapted to remain in contact with said soil in spite of variations in said soil contour and to form a passageway for said cable, said passageway restraining said cable in an area adjacent said rethreading means and said guide means.

5. The device of claim 3 wherein said guide means comprises a forward trough for receiving said cable, two inwardly-beveled forward edges for helping guide said cable into said trough, and means for digging a trench located in said forward edges.

6. The device described in claim 5 further comprising means for moving said rethreading means edges toward said guide means edges at rate faster than said actuating means rotates said guide means toward said soil.

References Cited

UNITED STATES PATENTS

| | | | |
|---|---|---|---|
| Re. 20,665 | 3/1938 | Lawton | 61—72.4 |
| 2,142,135 | 1/1939 | Lawton | 61—72.4 |
| 2,202,156 | 5/1940 | Lawton | 61—72.4 |
| 2,722,181 | 11/1955 | Hash | 61—72.6 |
| 3,217,499 | 11/1965 | Ishiki | 61—72.4 |

FOREIGN PATENTS 555,954   8/1932   Germany.

ERNEST R. PURSER, *Primary Examiner.*